(12) United States Patent
Dally et al.

(10) Patent No.: US 11,499,764 B2
(45) Date of Patent: Nov. 15, 2022

(54) CABLE MANAGEMENT FOR CRYOGENIC SYSTEM

(71) Applicant: Quantinuum LLC, Broomfield, CO (US)

(72) Inventors: Adam Dally, Champlin, MN (US); Charles Spencer Nichols, Marietta, GA (US); Chad Langness, Robbinsdale, MN (US)

(73) Assignee: Quantinuum LLC, Broomfield, CO (US)

( * ) Notice: Subject to any disclaimer, the term of this patent is extended or adjusted under 35 U.S.C. 154(b) by 233 days.

(21) Appl. No.: 16/560,917

(22) Filed: Sep. 4, 2019

(65) Prior Publication Data

US 2021/0063069 A1 Mar. 4, 2021

(51) Int. Cl.
| | |
|---|---|
| *F17C 3/00* | (2006.01) |
| *F25B 49/00* | (2006.01) |
| *H02G 3/03* | (2006.01) |
| *H01B 12/16* | (2006.01) |
| *H02G 3/32* | (2006.01) |
| *H01B 7/42* | (2006.01) |
| *H02G 5/10* | (2006.01) |
| *F17C 3/08* | (2006.01) |

(52) U.S. Cl.
CPC ............... *F25B 49/00* (2013.01); *H01B 7/42* (2013.01); *H01B 7/421* (2013.01); *H01B 7/428* (2013.01); *H01B 12/16* (2013.01); *H02G 3/03* (2013.01); *H02G 3/32* (2013.01); *H02G 5/10* (2013.01); *F17C 3/085* (2013.01); *F25B 2500/06* (2013.01)

(58) Field of Classification Search
CPC .......... H01B 7/42; H01B 7/421; H01B 7/428; H01B 12/16; H02G 3/03; H02G 3/32; H02G 5/10; F17C 3/085
See application file for complete search history.

(56) References Cited

U.S. PATENT DOCUMENTS

| | | | | |
|---|---|---|---|---|
| 3,803,343 | A * | 4/1974 | Carlson | H02G 5/06 174/71 B |
| 4,686,365 | A * | 8/1987 | Meek | H01J 49/38 250/281 |
| 5,093,759 | A * | 3/1992 | Davis | H05K 7/20545 361/721 |
| 2008/0251652 | A1* | 10/2008 | Hollender | H02G 3/30 248/65 |
| 2010/0122836 | A1* | 5/2010 | Pollard, Jr. | H02G 3/30 174/155 |
| 2012/0011859 | A1* | 1/2012 | Black | G01F 23/263 62/48.1 |
| 2015/0083463 | A1* | 3/2015 | Dannenberg | H02G 3/32 174/156 |
| 2016/0377230 | A1* | 12/2016 | Chuard | G01J 1/0252 62/447 |

* cited by examiner

*Primary Examiner* — Jonathan Bradford
(74) *Attorney, Agent, or Firm* — Schwegman Lundberg & Woessner, P.A.

(57) ABSTRACT

A cooled system includes an enclosure having an outer surface and an inner surface comprising a cooled enclosed area, multiple cable brackets thermally coupled to the outer surface of the enclosure, each cable bracket including a first surface conforming to the outer surface of the enclosure and an opening therethrough sized to hold a cable and conduct heat from the cable to the outer surface of the enclosure.

18 Claims, 3 Drawing Sheets

CABLE MANAGEMENT FOR CRYOGENIC SYSTEM

GOVERNMENT FUNDING

This invention was made with Government support. The Government has certain rights in this invention.

BACKGROUND

Some devices and experiments benefit from operating in very low temperatures. Some computers and superconducting materials require such low temperatures. It can be difficult to provide electrical power to devices located in a very low temperature environment without also conducting excess heat to such environments. The additional heat associated with providing electrical power requires more energy to be removed to maintain the suitable very low temperature environment, taxing cooling equipment.

SUMMARY

A cooled system includes an enclosure having an outer surface and an inner surface comprising a cooled enclosed area, multiple cable brackets thermally coupled to the outer surface of the enclosure, each cable bracket including a first surface conforming to the outer surface of the enclosure and an opening therethrough sized to hold a cable and conduct heat from the cable to the outer surface of the enclosure.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

Cryogenic systems require thermal shielding to reduce heat loads from radiation to areas that are cooled to very low temperatures. If electronics are also operating in the cooled area, conductors, such as wires and cables should also be cooled to prevent thermal conductivity through conductors coupled to such electronics.

Some electronics operate best at temperatures such as a few Kelvin or even a few milliKelvin. Cryogenic cooling devices may be used to provide suitable low temperature environments for such devices as well as for experiments that require very low temperatures. Such cooling devices may be used to provide such temperatures in stages, with a first stage providing a buffer cooled environment that may be several Kelvin warmer than the second stage very low temperature environment. In this buffer cooled environment, temperatures may be at or near 40 K, while the second stage very low temperature may range below 40 K, such a 4 K or as low as a few milliK.

Some electronic devices, such as a radio frequency generator, may be positioned within the warmer cooled buffer environment Other devices, such as an oven may also be placed in the buffer first stage cooled environment. The oven and RF generator are examples of a multitude of heat generating devices that may be positioned outside the cooler very low temperature environment to reduce the amount of heat that needs to be removed from the cooler quantum environment of the second stage.

DC control cables or wires may also be used to control components very low temperature second stage environment as well as control the devices in the first stage. Various types of cables may also be used to provide power to such first stage located devices. At least some of the cables may originate from a much warmer environment, such as a room at 300 K in which the cryogenic system is situated.

Each of the cables may conduct heat within their cores into both the first and second stage environments. In various embodiments, of the present inventive subject matter, heat is removed from the various different types of cables via a cable management system before entering the cooled environments.

Figure 1:
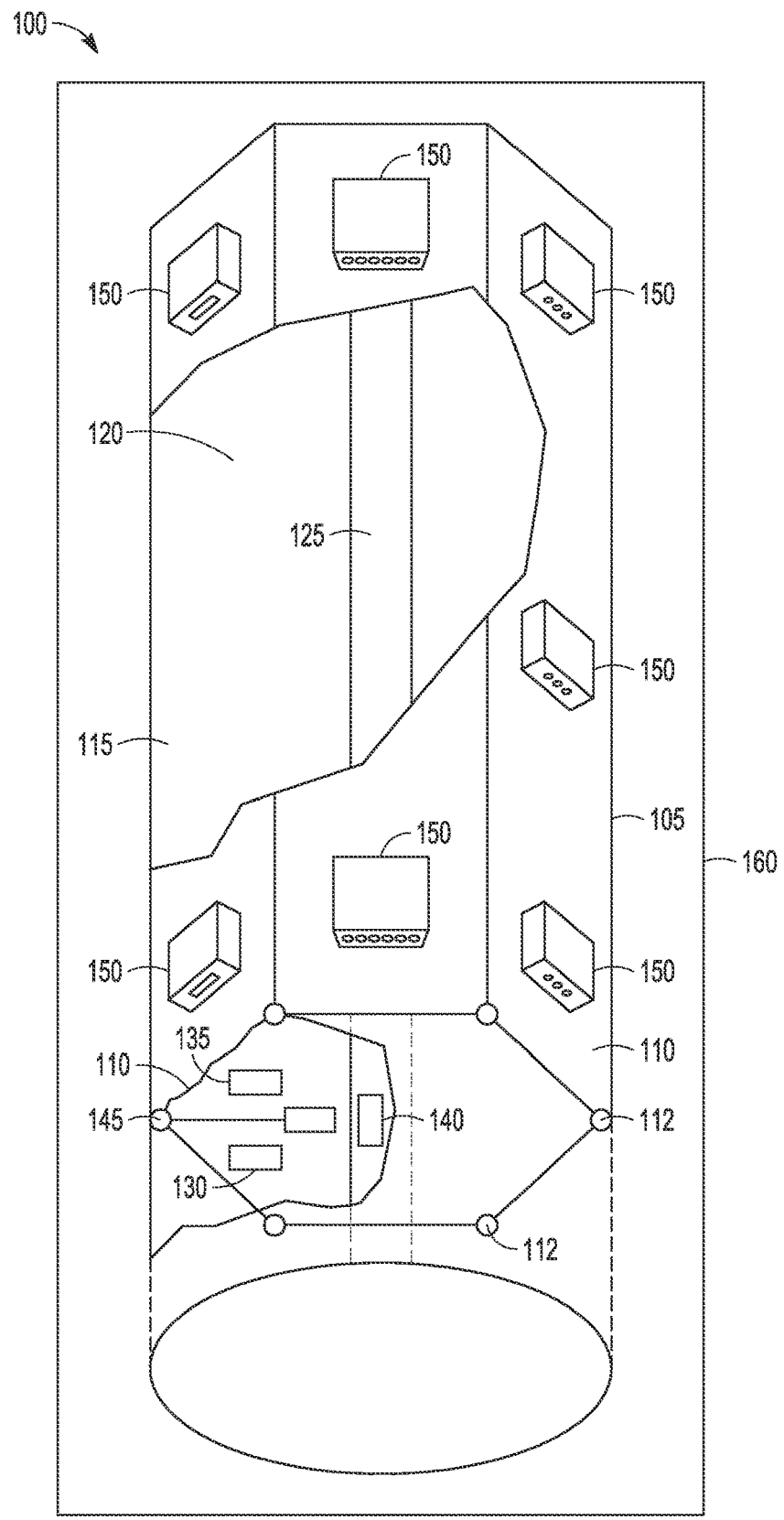
FIG. 1 is a block diagram illustrating a cryogenically cooled computing system according to an example embodiment.

FIG. 1 is a block cutaway perspective representation of a cryogenically cooled system 100. System 100 includes an enclosure 105 made of multiple flat rectangular panels 110 that are attached along vertical edges to posts 112 to form polyhedral prism having an inside cooled environment referred to as enclosed area 115. In various embodiments, 3 or more such panels may be used to form the prism. 4, 5, 6, 7, 8, or more panels may be used in further embodiments. The elements and areas shown inside enclosed area 115 are not meant to represent precise positions or sizes of such elements but are merely representing that such elements are within the enclosure 105.

The inside cooled environment includes two cooled stages, a first stage 120, referred to as a buffer environment, and a second stage 125 within the first stage 120, referred to as a second stage environment. The sizes and locations of the stages are not shown to scale or actual location. The panels 110 are formed of thermally and electrically conductive material such as copper or aluminum and are grounded to form a grounded shield around the inside cooled environment, enclosed area 115.

The first stage 120 may include many different heat generating devices, such as an oven 130. An RF generator 135 is another example of a heat generating device that may be placed in the first stage. A device 140 may be placed in the second stage 125. Examples of device 140 include superconducting material, which may be used to conduct electricity between devices. Experimental devices may also be placed in the second stage 125. Control circuitry 145 is used to control various devices, such as the oven 130, RF generator 135 and even device 140.

The panels 110 include various brackets 150 that are used to hold various types of cables, such as electrical wires that carry power and control signals to the various electrical components in the first and second stages, such as the oven 130, RF generator 135, and control circuitry 145 for example. The brackets and panels form a cable management system to protect the cables and remove heat from the cables. The brackets 150 are coupled to the panels 110 on sides of the panels 110 that are outside the enclosed area 115. The panels 110 may be formed of a conductive material in one embodiment, or other material that is heat conductive. The brackets are also formed of a thermally conducting material, such as metal or other material, and are formed to contact the conductor to remove heat from the conductor and hence minimize the heat load provided to the first and second stages or zones. There may be multiple brackets on each panel to space the wires from the panel or otherwise hold the wires in thermal contact with the panel. The brackets may be configured differently for each type of wire.

In one embodiment, the panels 110 forming the enclosure are all positioned within a vacuum chamber indicated in block form at 160. The vacuum chamber 160 enables less power to be consumed in maintaining the suitable cool environments in the first and second stages.

Figure 2:
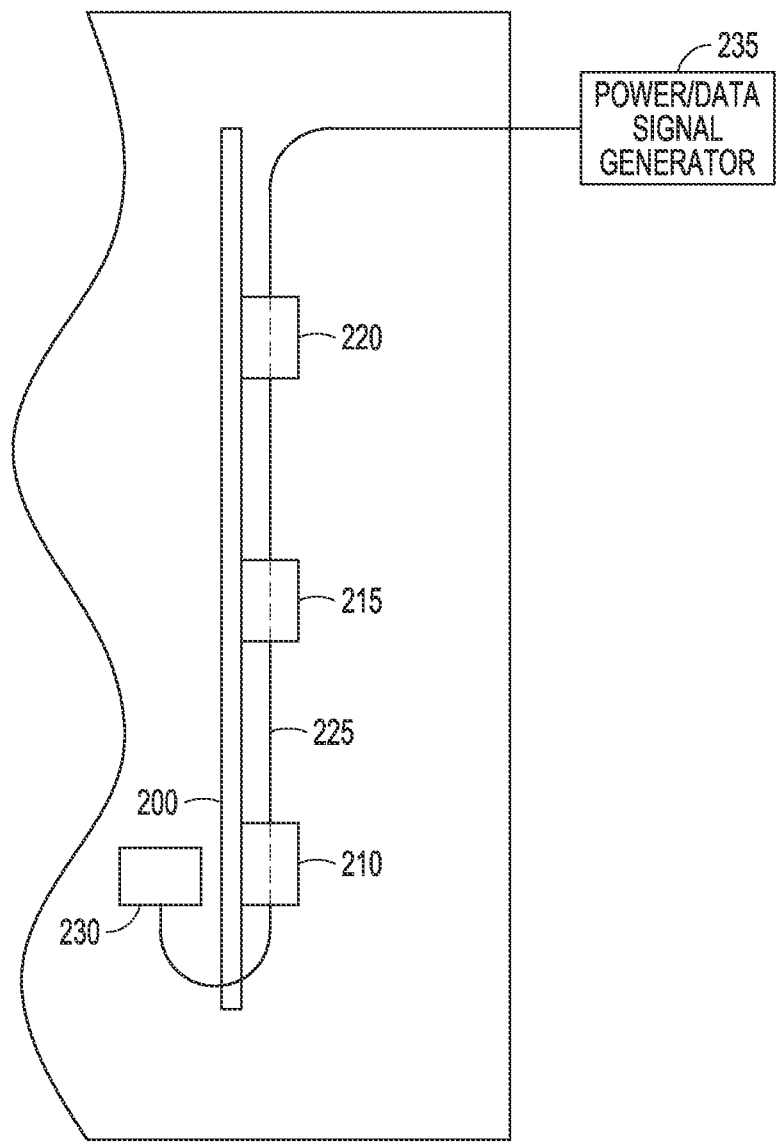
FIG. 2 is a side view of a panel showing brackets coupled to the panel according to an example embodiment.

FIG. 2 is a side view of a panel 200 showing brackets 210, 215, and 220 coupled to the panel 200. The brackets are shown supporting a cable 225, which may be any type of cable for carrying signals for devices within the are enclosed by the multiple coupled panels in FIG. 1. Cable 225 is shown enclosed by each of the brackets to remove heat from the cable 225 prior to the cable entering the first and optionally the second cooled stages within the enclosure. The heat is conducted to the cryogenically cooled panel 200 through the brackets. The cable 225 may be electrically insulated to prevent electrical shorting to both the brackets and the panel 200. The cable is spaced from the panel in one embodiment by the brackets and runs along a length of the panel 200 and through an opening in the panel 200 to a device 230 within either of the cooled environments corresponding to the first and second stages. The cable may be spaced or in contact with the panel to provide thermal conductivity directly with the panel and prevent movement and possible wear and tear on the insulation of the cables which may result in an electrical short to the grounded panels. Various distances between the cable and panel may be used depending on the preferences of a designer that may be influenced by the application for system 100 and the desired temperatures in the first and second stages.

The cable 225 is also shown connected to a signal generator 235. In various embodiments, the cable 225 may represent many different types of cables for providing signals to and from the elements within the enclosure, such as control signals via one or more ribbon cables. Signal generator 235 may include high power electrical conductors for providing power to one or more devices, such as the heating elements of oven 130 or RF generator 135 indicated at 230. The oven 130 may include three heating elements in one embodiment, utilizing three sets of wires to provide electricity to the heating elements for 6 wires total. Additional ovens may be used in further embodiments. In some embodiments, coaxial cables may be used, and in further embodiments optical fibers may be used.

Cryogenically cooled systems are easier to install with the use of the panels with brackets and cables/wiring attached. The brackets and cables/wiring may be installed on the panels prior to installation of a system at a customer site. The brackets and corresponding wiring may be distributed to brackets in a manner that facilitates connection to the components in the cooled area. For instance, a panel with an opening for the oven may have brackets with the cables that are used for powering the heating elements. Other panels may have openings customized for access to elements inside the enclosure 115 near such panels in one of the cooled environments and having cables corresponding to such elements.

Figure 3:
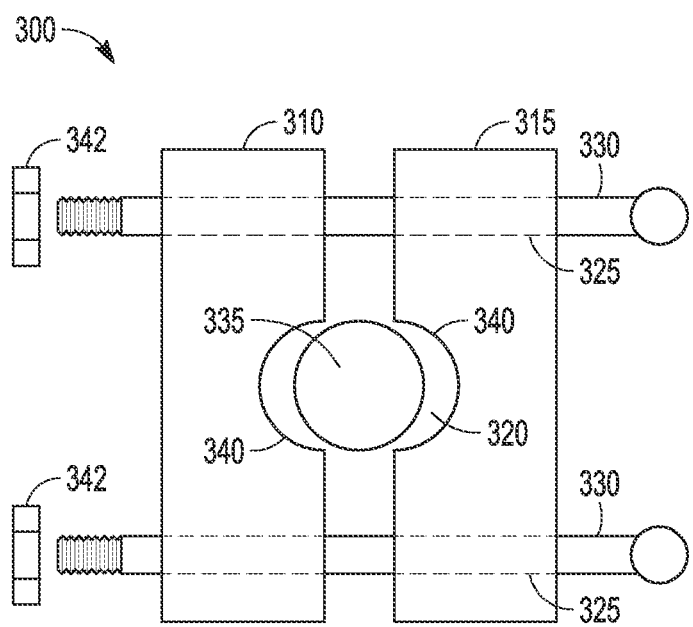
FIG. 3 is a top exploded view of a first type of bracket for a round cable conductor according to an example embodiment.

FIG. 3 is a top exploded view of a first type of bracket 300 for a round cable conductor. The bracket may be formed in two portions, 310 and 315, forming an opening 320, such as by casting, milling, printing, or other suitable means of forming a heat conducting structure. Two or more openings 325 for screws or bolts 330 may be provided to pinch or clamp the two portions 310 and 315 around the cable 335 and contact the cable on all sides to remove heat from the cable via thermal conduction to the panel. The clamping force may be sufficient to prevent movement of the cable and provide for good thermal conductivity from the cable to the bracket without damaging the cable. In some embodiments, an optional additional layer 340 may be positioned between the portions and the cable to further protect the cable. The additional layer may be thermally conductive and may also be electrically insulative. Other means of attaching the bracket to the panel may be used to provide a thermal as well as physical coupling, such as welding, adhesive, clamps, and other attachment mechanisms in further embodiments. When attached to the panel, the bolts or screws draw the portions together to clamp the cable to facilitate transfer of heat from the cable to the portions and then to the panel. The panel may have threaded portions to mate with the bolts, or the bolts may have nuts 342 to couple to ends of the bolts extending through the panel to secure the brackets to the panel.

Figure 4:
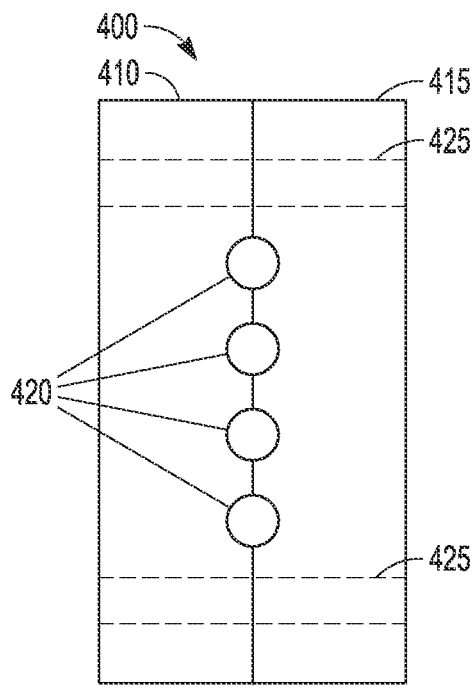
FIG. 4 is a top view of a second type of bracket for multiple round cable conductors according to an example embodiment.

FIG. 4 is a top view of a second type of bracket 400 for multiple round cable conductors. The bracket may be formed in two portions. 410 and 415, forming multiple openings 420 for multiple conductors, such as insulated electrical wires, optical cables, or other signal/energy conducting means. Two or more openings 425 for screws or bolts may be provided to couple the two portions 410 and 415 around the conductors and contact the conductors on all sides to remove heat from the conductors via thermal conduction to the panel. Optional additional layers may be used such additional layer 340 in FIG. 3.

Figure 5:
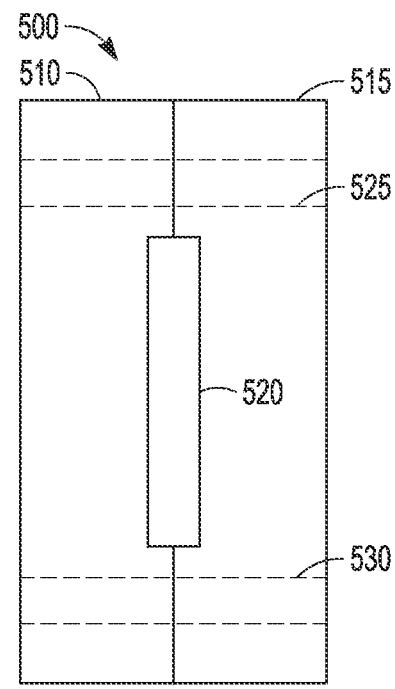
FIG. 5 is a top view of a third type of bracket for a flat ribbon cable conductor according to an example embodiment.

FIG. 5 is a top view of a third type of bracket 500 for a flat ribbon cable conductor. The bracket may be formed in two portions, 510 and 515, forming an opening 520. Two or more openings 525 for screws or bolts 530 may be provided to couple the two portions 410 and 415 around a ribbon cable and contact the cable on all sides to remove heat from the cable via thermal conduction to the panel. Optional additional layers may be used such additional layer 340 in FIG. 3.

EXAMPLES

1. A cooled system includes an enclosure having an outer surface and an inner surface comprising a cooled enclosed area, multiple cable brackets thermally coupled to the outer surface of the enclosure, each cable bracket including a first surface conforming to the outer surface of the enclosure and an opening therethrough sized to hold a cable and conduct heat from the cable to the outer surface of the enclosure.

2. The cooled system of example 1 wherein the opening of the brackets is sized to thermally contact the cable on all sides of the cable.

3. The cooled system of any of examples 1-2 wherein the brackets are formed of thermally conductive material and are coupled to the outer surface of the enclosure by screws.

4. The cooled system of example 3 wherein the brackets include a first portion having the first surface and a first open portion and a second portion having second open portion positioned to mate with the first open portion to form the opening sized to hold the cable in response to the first and second portions being coupled together by the screws.

5. The cooled system of any of examples 1-4 wherein the opening has a cross section corresponding to a ribbon cable.

6. The cooled system of any of examples 1-5 wherein the opening has a circular cross section corresponding to a round electrical cable.

7. The cooled system of any of examples 1-6 wherein the opening comprises multiple openings having cross sections corresponding to multiple electrical cables.

8. The cooled system of any of examples 1-7 wherein the enclosure comprises multiple flat rectangular panels coupled on long edges to form the enclosure comprising a polyhedron.

9. The cooled system of example 8 wherein the panels and brackets are formed of thermally conductive material.

10. The cooled system of any of examples 8-9 and further comprising a cable supported in the opening of each bracket spaced apart from one of the flat rectangular panels and extends into the cooled enclosure to provide a signal to an element within the cooled enclosure.

11. The cooled system of example 10 wherein multiple panels have sets of cable brackets, wherein at least two sets of cable brackets have openings corresponding to and supporting different types of cables.

12. The cooled system of any of examples 8-11 wherein the elements comprise an oven, an RF generator, or control electronics, or any combination thereof.

13. The cooled system of any of examples 1-12 wherein the enclosed area includes a first cooled area and a second cooled area maintained at a temperature suitable for maintaining superconductivity of a selected superconductor.

14. The cooled system of example 13 wherein the first and second cooled areas are cooled by a cryogenic cooler.

15. The cooled system of example 14 wherein the second cooled area is cooled to a temperature of less than approximately 4 K and the first cooled area is cooled to a temperature warmer than the second cooled area.

16. A method includes holding a cable in multiple spaced apart brackets on a first side of a heat conducting panel, the brackets spacing the cable from the panel, providing electricity via the cable to a device on a second side, opposite the first side, of the heat conducting panel, and transferring heat generated by the electricity in the cable to the heat conducting panel via thermal conduction through the multiple spaced apart brackets.

17. The method of example 16 and further comprising coupling multiple heat conducting panels on edges to form a polyhedral enclosure, wherein at least two of the heat conducting panels contain sets of spaced apart brackets holding cables of different types.

18. The method of example 17 and further comprising cooling the device to a temperature of less than approximately 4 K.

19. The method of example 18 wherein the device comprises a superconductor.

20. The method of any of examples 17-19 and further comprising placing the enclosure into a vacuum.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A cooled system comprising:
   an enclosure having an outer surface and an inner surface comprising a cooled enclosed area;
   multiple cable brackets formed as at least one block of thermally conductive material thermally coupled to the outer surface of the enclosure, each cable bracket comprising:
   a first surface conforming to the outer surface of the enclosure; and
   an opening therethrough sized to hold a cable and conduct heat from the cable to the outer surface of the enclosure.

2. The cooled system of claim 1 wherein the openings of the brackets are sized to thermally contact the cable on all sides of the cable and run through a length of each bracket.

3. The cooled system of claim 1 wherein the brackets are coupled to the outer surface of the enclosure by screws.

4. The cooled system of claim 3 wherein the brackets each comprise:
   a first portion having the first surface and a first open portion; and
   a second portion having a second open portion positioned to mate with the first open portion to form the opening sized to hold the cable in response to the first and second portions being coupled together by the screws.

5. The cooled system of claim 1 wherein each opening has a cross section corresponding to a ribbon cable.

6. The cooled system of claim 1 wherein each opening has a circular cross section corresponding to a round electrical cable.

7. The cooled system of claim 1 wherein each opening comprises multiple openings having cross sections corresponding to multiple electrical cables.

8. The cooled system of claim 1 wherein the enclosure comprises multiple flat rectangular panels coupled on long edges to form the enclosure comprising a polyhedron.

9. The cooled system of claim 8 wherein the panels and brackets are formed of thermally conductive material.

10. The cooled system of claim 8 and further comprising a cable supported in the opening of each bracket spaced apart from one of the flat rectangular panels and that extends into the cooled enclosure to provide a signal to an element within the cooled enclosure.

11. The cooled system of claim 10 wherein multiple panels have sets of cable brackets, wherein at least two sets of cable brackets have openings corresponding to and supporting different types of cables.

12. The cooled system of claim 10 wherein the enclosure encloses multiple elements comprising an oven, an RF generator, or control electronics, or any combination thereof.

13. The cooled system of claim 1 wherein the enclosed area comprises first and second cooled areas that are cooled by a cryogenic cooler.

14. The cooled system of claim 13 wherein the second cooled area is cooled to a temperature of approximately 4 K and the first cooled area is cooled to a temperature warmer than the second cooled area.

15. A method comprising:
- holding a cable in multiple spaced apart brackets formed as at least one block of thermally conductive material having openings therethrough sized to hold the cable and conduct heat from the cable to a first side of a heat conducting panel, the brackets spacing the cable from the panel;
- providing electricity via the cable to a device on a second side, opposite the first side, of the heat conducting panel; and
- transferring heat generated by the electricity in the cable to the heat conducting panel via thermal conduction through the multiple spaced apart brackets.

16. The method of claim 15 and further comprising coupling multiple heat conducting panels on edges to form a polyhedral enclosure, wherein at least two of the heat conducting panels contain sets of spaced apart brackets holding cables of different types.

17. The method of claim 16 and further comprising cooling the device to a temperature of approximately 4 K.

18. The method of claim 16 and further comprising placing the enclosure into a vacuum.

* * * * *